(12) United States Patent
Todd et al.

(10) Patent No.: US 11,310,272 B2
(45) Date of Patent: Apr. 19, 2022

(54) METHOD AND SYSTEM CREATING AND USING DATA CONFIDENCE FABRIC PROCESSING PATHS

(71) Applicant: EMC IP Holding Company LLC, Hopkinton, MA (US)

(72) Inventors: Stephen James Todd, North Conway, NH (US); Jason A. Shepherd, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 264 days.

(21) Appl. No.: 16/665,696

(22) Filed: Oct. 28, 2019

(65) Prior Publication Data

US 2021/0037056 A1   Feb. 4, 2021

Related U.S. Application Data

(63) Continuation-in-part of application No. 16/529,743, filed on Aug. 1, 2019, now Pat. No. 10,812,326.

(51) Int. Cl.

| H04L 29/06 | (2006.01) |
|---|---|
| G06F 11/26 | (2006.01) |
| H04L 9/32 | (2006.01) |
| G06F 13/40 | (2006.01) |
| G06F 13/16 | (2006.01) |

(52) U.S. Cl.
CPC .............. *H04L 63/18* (2013.01); *G06F 11/26* (2013.01); *G06F 13/1668* (2013.01); *G06F 13/4027* (2013.01); *H04L 9/3273* (2013.01)

(58) Field of Classification Search
CPC ........ H04L 63/18; H04L 9/3273; G06F 11/26; G06F 13/1668; G06F 13/4027
See application file for complete search history.

(56) References Cited

U.S. PATENT DOCUMENTS

| 8,474,032 B2 | 6/2013 | Fetik |
| 8,959,070 B2 | 2/2015 | Elbaz |
| 2005/0257045 A1 | 11/2005 | Bushman |
| 2005/0277403 A1 | 12/2005 | Schmidt |
| 2015/0356494 A1 | 12/2015 | Kolesnikov |
| 2015/0363109 A1 | 12/2015 | Frick |
| 2020/0120023 A1 | 4/2020 | Munson et al. |
| 2020/0244701 A1 | 7/2020 | Di Domenico et al. |
| 2020/0274713 A1 | 8/2020 | Li |
| 2021/0224093 A1 | 7/2021 | Fu et al. |

*Primary Examiner* — Brian Whipple
(74) *Attorney, Agent, or Firm* — Chamberlain, Hrdlicka, White, Williams & Aughtry

(57) ABSTRACT

In general, in one aspect, the invention relates to a method for managing data, the method includes performing, by a data confidence fabric (DCF) node, a trust operation with a remote DCF node, updating, based on the trust operation, a trust level associated with the remote DCF node to obtain an updated trust level, integrating, based on the updated trust level, the remote DCF node into a DCF processing path to obtain a second DCF processing path, wherein the DCF processing path comprises the DCF node, and processing data using the second DCF processing path.

20 Claims, 13 Drawing Sheets

METHOD AND SYSTEM CREATING AND USING DATA CONFIDENCE FABRIC PROCESSING PATHS

CROSS-REFERENCE TO RELATED APPLICATIONS

This application is a continuation-in-part application of U.S. patent application Ser. No. 16/529,743 filed on Aug. 1, 2019. U.S. patent application Ser. No. 16/529,743 is hereby incorporated by reference in its entirety.

BACKGROUND

Systems may be configured to obtain information from multiple devices. Traditional approaches to configuring such systems require manual configuration and manual updating as devices from which the system is receiving information change.

SUMMARY

In general, in one aspect, the invention relates to a method for managing data, the method comprising performing, by a data confidence fabric (DCF) node, a trust operation with a remote DCF node; updating, based on the trust operation, a trust level associated with the remote DCF node to obtain an updated trust level; integrating, based on the updated trust level, the remote DCF node into a DCF processing path to obtain a second DCF processing path, wherein the DCF processing path comprises the DCF node; and processing data using the second DCF processing path.

In general, in one aspect, the invention relates to non-transitory computer readable medium comprising computer readable program code, which when executed by a computer processor enables the computer processor to perform a method, the method comprising: performing, by a data confidence fabric (DCF) node, a trust operation with a remote DCF node, updating, based on the trust operation, a trust level associated with the remote DCF node to obtain an updated trust level, integrating, based on the updated trust level, the remote DCF node into a DCF processing path to obtain a second DCF processing path, wherein the DCF processing path comprises the DCF node, and processing data using the second DCF processing path.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing DCF nodes. More specifically, embodiments of the invention include using a data management system to obtain configuration requirements from clients to configure the DCF node. The data management system may generate a data confidence fabric (DCF) configuration file and deploy the DCF configuration file to one or more corresponding DCF nodes.

Further, embodiments of the invention include functionality for configuring node managers of the corresponding DCF nodes in accordance with the obtained DCF configuration file and to process the subsequently received data in accordance with the DCF configuration file.

Further, embodiments of the invention relate to linking DCF nodes in the same DCF and/or across multiple different DCFs in order to leverage the processing capabilities of DCF nodes and different DCFs. More specifically, embodiments of the invention relate to the discovery of DCF nodes in other DCFs, determining whether to use the discovered DCF nodes, and then integrating the DCF nodes into a DCF processing path that includes DCF nodes from different DCFs.

Figure 1A:
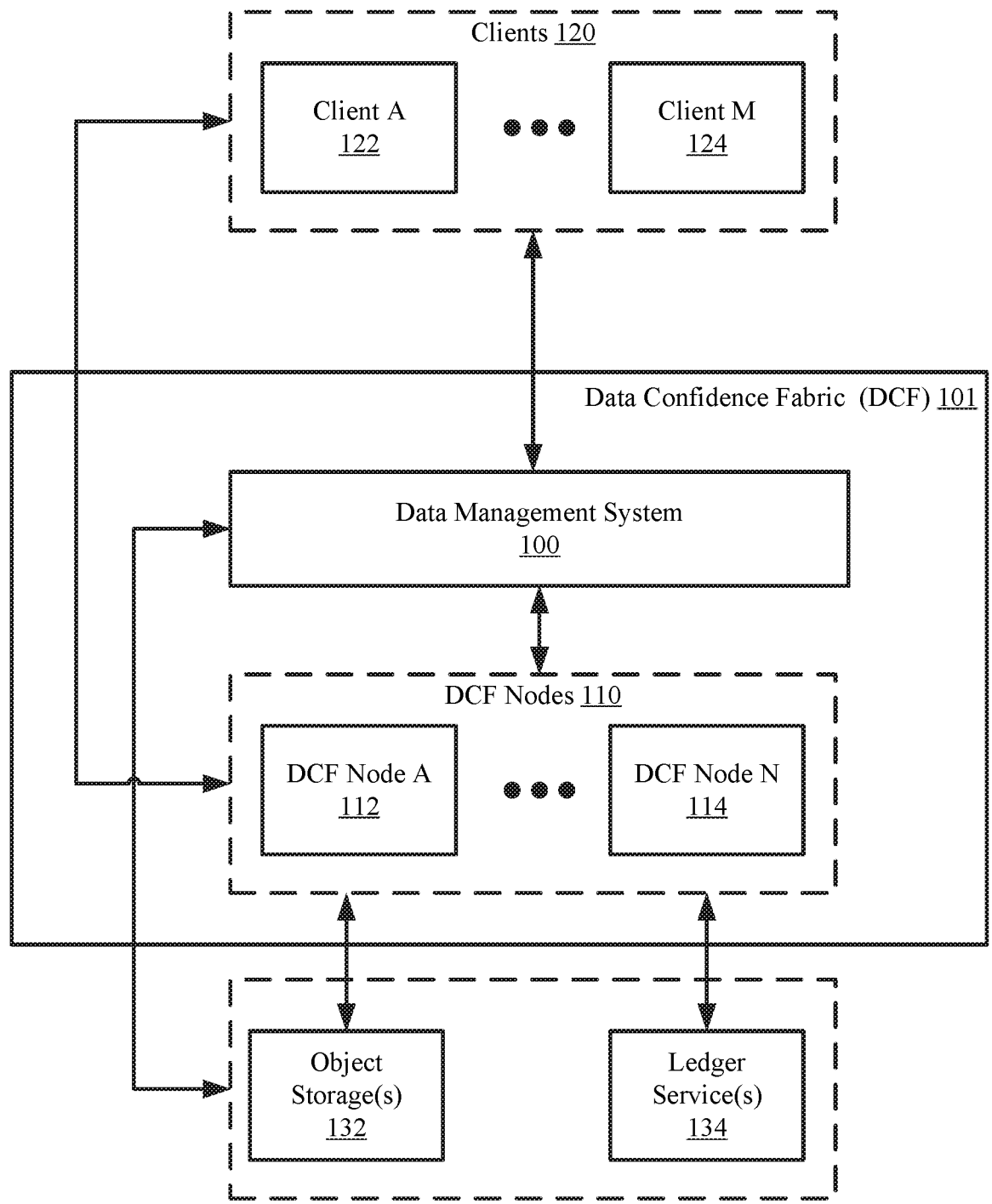
FIG. 1A shows a diagram of a system in accordance with one or more embodiments of the invention.

FIG. 1A shows a diagram of a system in accordance with one or more embodiments of the invention. The system includes a data management system (100), DCF nodes (110), clients (120), an object storage (132), and a ledger service (134). Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, the data management system (100) manages a data confidence fabric (101). In one or more embodiments of the invention, a data confidence fabric (DCF) is a logical grouping of computing devices configured to store data and provide data to clients (120). In one or more embodiments of the invention, the DCF nodes (110) are part of the DCF.

In one or more embodiments of the invention, the data management system (100) manages the DCF by configuring computing devices associated with the DCF to store data and/or provide data in a way that is requested by the clients (120). The data management system (100) may communicate with the clients by providing the clients a set of options for configuring the DCF computing devices (e.g., the DCF nodes (110)). The data management system may be further equipped to deploy configurations based on a selection of configuration options selected by the clients. For additional details regarding the configuration management of the data management system (100), see, e.g., FIG. 2A.

In one embodiment of the invention, a client is an entity that requests the processing of data obtained by a DCF node using a DCF pipeline (described below).

In one embodiment of the invention, the data management system also includes functionality to configure DCF processing paths by linking together DCF nodes within the DCF (101) as well as with other DCF nodes in other DCFs (not shown). More specifically, a DCF processing path is a set of DCF nodes that are organized to process data in a specific sequence or order. The DCF processing path may include one or more DCF nodes (see e.g., FIGS. 1C and 1D). Further, the DCF nodes may or may not belong to the same DCF.

In one embodiment of the invention, each DCF processing path includes at least a source DCF node (see e.g., FIG. 1C), which includes or is connected to a local data source. The data obtained by the source DCF node may be processed by only the source DCF node or it may be processed by a combination of the source DCF node and one or more other DCF nodes. If the data is to be processed by other DCF nodes, the data management system may generate a DCF processing path that specifies all DCF nodes that are processing the data, the order in which each DCF node processes the data, and the specific processing that each DCF node is going to perform on the data. If any of the DCF nodes are not in the DCF that includes the source DCF node, then the data management system (or other DCF nodes in the aforementioned DCF) may first determine whether or not to use DCF nodes that are not in the aforementioned DCF (i.e., whether to use remote DCF nodes) in accordance with FIG. 2D. If it is ultimately determined that the remote DCF node(s) may be integrated (or otherwise used) in the DCF processing path, then the remote DCF node is integrated (or available for integration) into the DCF processing path and subsequently used to process data that originated from the source DCF node.

Thus, various embodiments of the invention provide a mechanism to enable data that originates in a DCF to be processed using DCF nodes in other DCFs. This enables the DCF to leverage the processing capabilities of other DCFs. However, because the data that originated from the DCF is being processed externally (at least in part), various embodiments of the invention provide mechanisms to determine whether to integrate remote DCF nodes into a DCF processing path and to monitoring the remote DCF nodes after they have been integrated into the DCF processing path.

Figure 4:
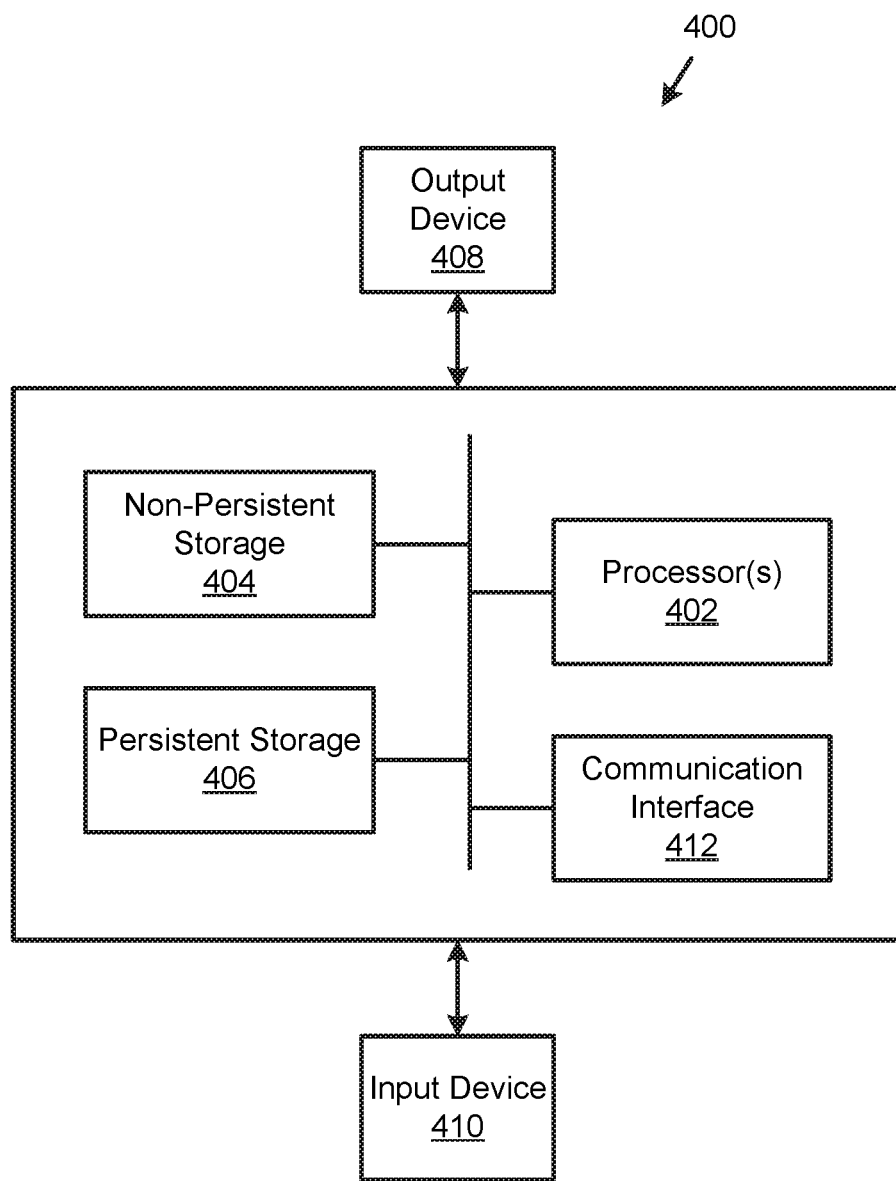
FIG. 4 shows a diagram of a computing device in accordance with one or more embodiments of the invention.

Continuing with the discussion of FIG. 1, in one or more embodiments of the invention, the data management system (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data management system (100) described in this application and/or all, or portion, of the methods illustrated in FIGS. 2A and 2D.

The data management system (100) may be implemented as a logical device without departing from the invention. The logical device utilizes computing resources of any number of physical computing devices to provide the functionality of the data management system (100) described throughout this application and/or all, or portion, of the methods illustrated in FIGS. 2A and 2D. For additional details regarding the data management system, see, e.g., FIG. 1B.

In one or more embodiments of the invention, the DCF nodes (110) are systems associated with a data confidence fabric that obtains data, stores data, provides data, isolates data, and/or execute applications based on the stored data. The DCF nodes (110) may provide the stored data and/or applications to the clients as specified by terms agreed to by the clients based on transactions between the clients and the DCF nodes (110).

Figure 3A:
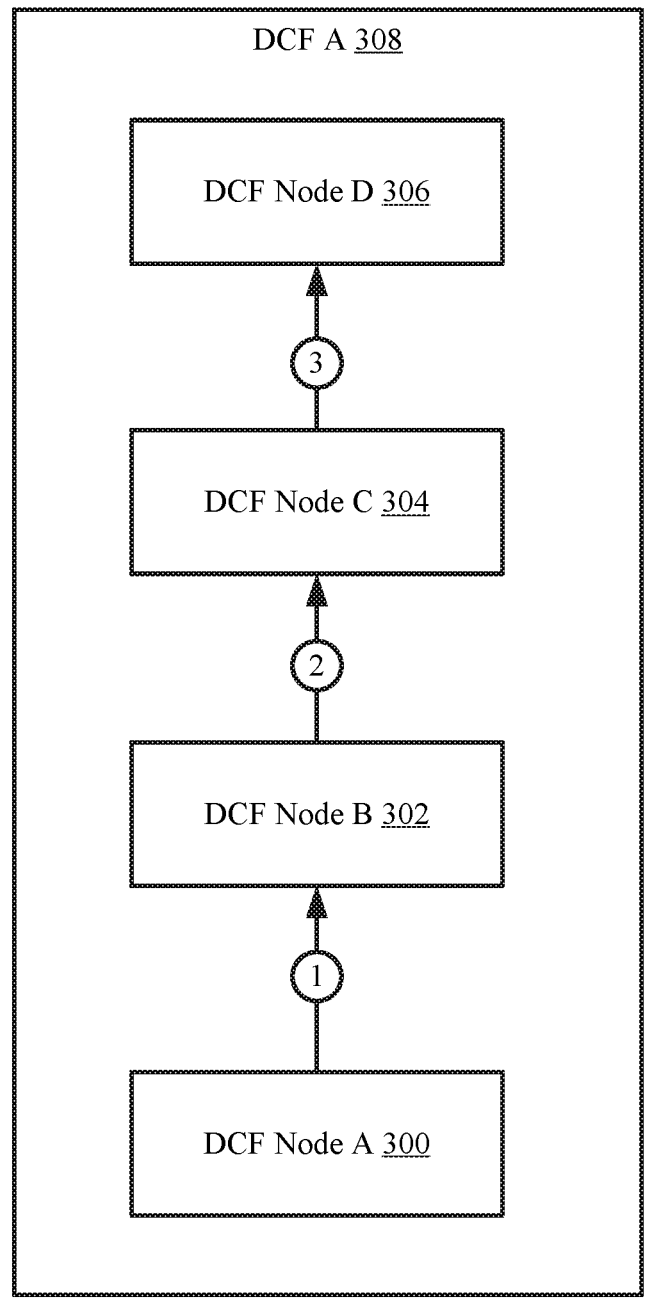
FIGS. 3A-3D show an example in accordance with one or more embodiments of the invention.

In one or more embodiments of the invention, DCF nodes may be source DCF nodes (see e.g., FIG. 1C) or non-source DCF nodes (see e.g., 1D). Further, the DCF nodes within a given DCF may be organized into one or more DCF processing paths (see e.g., FIG. 3A), which may include remote DCF nodes (see e.g., FIG. 3C). Further, each of the DCF nodes may be associated with one or more DCF processing paths. In one embodiment of the invention, the data management system (100) may include functionality to configure one or more of the DCF nodes (110).

In one or more embodiments of the invention, each DCF node (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the DCF node (110) described throughout this application and/or all, or portion, of the method illustrated in FIGS. 2B-2D.

A DCF node (112, 114) may be implemented as a logical device without departing from the invention. The logical device utilizes computing resources of any number of physical computing devices to provide the functionality of the DCF node (112, 114) described throughout this application and/or all, or portion, of the method illustrated in FIGS. 2B-2D. For additional details regarding a DCF node (112, 114), see, e.g., FIGS. 1C-1D.

In one or more embodiments of the invention, the clients (120), via clients executing thereon, may utilize computing resources and/or access data of the DCF nodes (110). The clients executing on the clients (120) may further communicate with the data management system (100) to select configuration options for configuring computing devices of the DCF nodes (110) and provide the options to the data management system (100).

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

In one or more embodiments of the invention, an object storage (132) is a service that stores data and, optionally, metadata obtained from the DCF nodes (110). The object storage (132) may be equipped to store immutable entries (i.e., entries that cannot be modified or deleted), where each entry includes an object data identifier of the data and/or additional metadata of the data. The object data identifier (OID) may be a unique identifier generated by performing a function (e.g., a hash function) on an obtained data set (or a portion thereof) to obtain a unique value (i.e., the object data identifier). The object storage (132) may be internal or external to a DCF node (112, 114) without departing from the invention.

In one or more embodiments of the invention, the additional metadata of an entry may specify additional information about a data set such as, for example, an owner of the data set (e.g., specified using a decentralized identifier (DID)), a geographical location of the data set, and/or other information associated with the data set without departing from the invention.

In one or more embodiments of the invention, the object storage (132) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the object storage (132) described throughout this application.

In one or more embodiments of the invention, the object storage (132) is implemented as a logical device. The logical device may utilize computing resources of any number of physical computing devices to provide the functionality of the object storage (132) described throughout this application.

In one or more embodiments of the invention, a ledger service (134) is a service that stores data and/or metadata obtained from the DCF nodes (110). The ledger service (134) may be equipped to store immutable entries, where each entry includes a data and/or the metadata of the data. The ledger service may be internal or external to a DCF node (112, 114) without departing from the invention. In scenarios in which the entries do not include the data (or where the data is otherwise not stored in the ledger service), the entries may include a reference to the data (e.g., a reference to a location in the object storage and/or a reference to a location in the node manager).

The ledger service may differ from the object storage (132) in that the ledger service (134) is equipped to implement security measures for the immutable entries. The security measures may include, for example, using private key decryption, peer validation (e.g., using third-party computing devices to validate the entries), etc. Other security measures may be implemented on the immutable entries of the ledger service (134) without departing from the invention.

The ledger service (134) may further differ from the object storage (132) by storing a limited amount of data. Said another way, each entry of the ledger service (134) may use less data than the object storage such that the total amount of data stored in the ledger service (134) is less than that of the object storage (132). For example, an entry of the ledger service (134) may store a hash value of the data stored in an entry of the object storage (132).

In one or more embodiments of the invention, the ledger service (134) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the ledger service (134) described throughout this application.

In one or more embodiments of the invention, the ledger service (134) is implemented as a logical device. The logical device may utilize computing resources of any number of physical computing devices to provide the functionality of the ledger service (134) described throughout this application.

In one or more embodiments of the invention, the ledger service (134) is implemented as a distributed ledger (e.g., a block chain). The logical device may utilize computing resources of any number of physical computing devices to provide the functionality of the ledger service (134) described throughout this application.

Figure 1B:
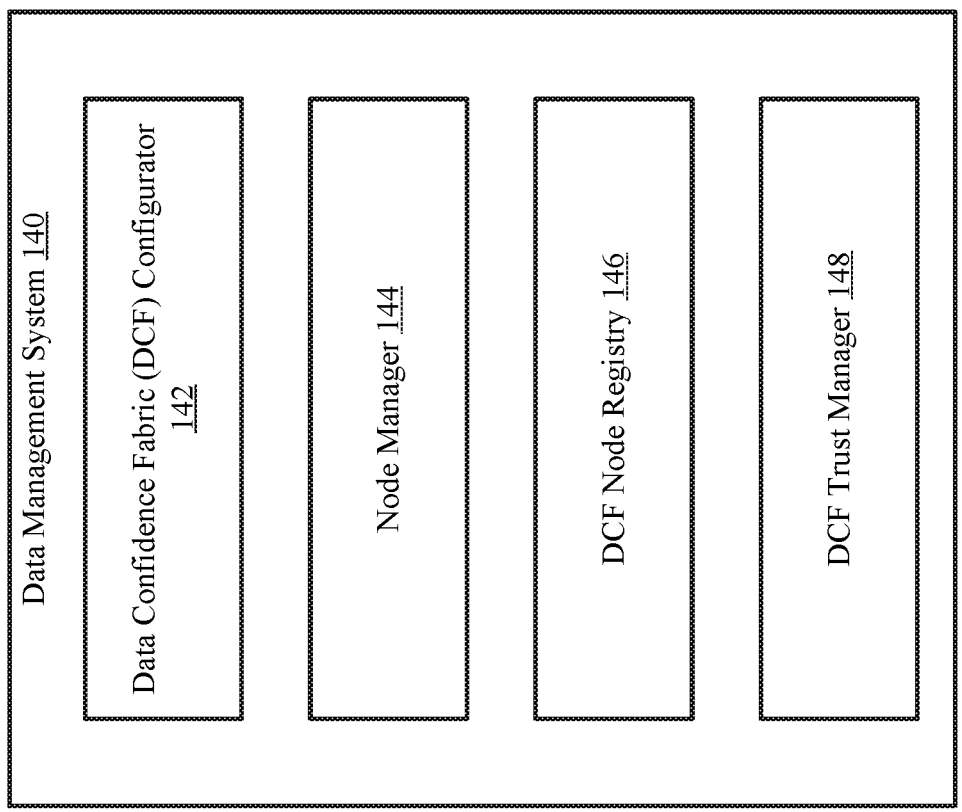
FIG. 1B shows a diagram of a data management system in accordance with one or more embodiments of the invention.

FIG. 1B shows a diagram of a data management system in accordance with one or more embodiments of the invention. The data management system (140) may be an embodiment of the data management system (100, FIG. 1A) discussed above. As discussed above, the data management system (140) communicates with clients to obtain a selection of configuration options and uses the selection to generate DCF configuration files to be deployed to one or more DCF nodes.

To perform the aforementioned functionality, the data management system (140) includes a data confidence fabric (DCF) configurator (142), a node manager (144), a DCF node registry (146), and a DCF trust manager (148). The DCF configurator (142), a node manager (144), the node registry (146), and the DCF trust manager (148) may be operably connected via any combination of wired and/or wireless networks without departing from the invention. The data management system (140) may include additional, fewer, and/or different components without departing from the invention. Each of the aforementioned components is discussed below.

Figure 2A:
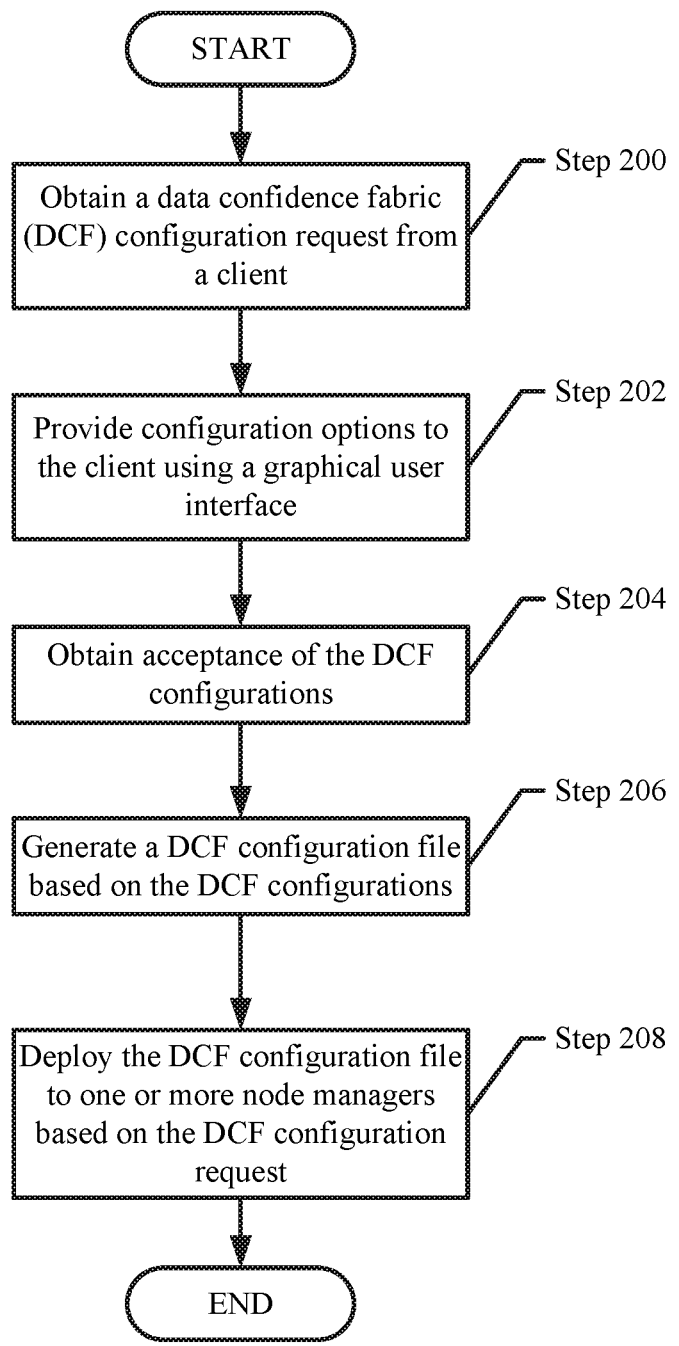
FIG. 2A shows a flowchart for managing a data confidence fabric (DCF) configuration in accordance with one or more embodiments of the invention.
Figure 2B:
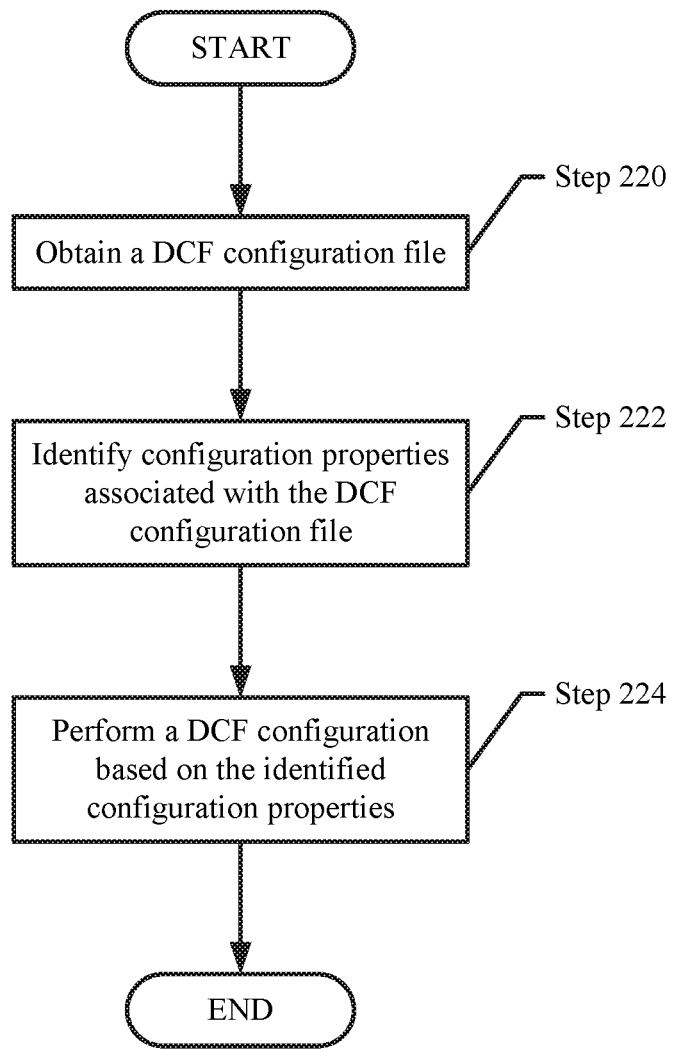
FIG. 2B shows a flowchart for configuring a node manager in accordance with one or more embodiments of the invention.
Figure 2C:
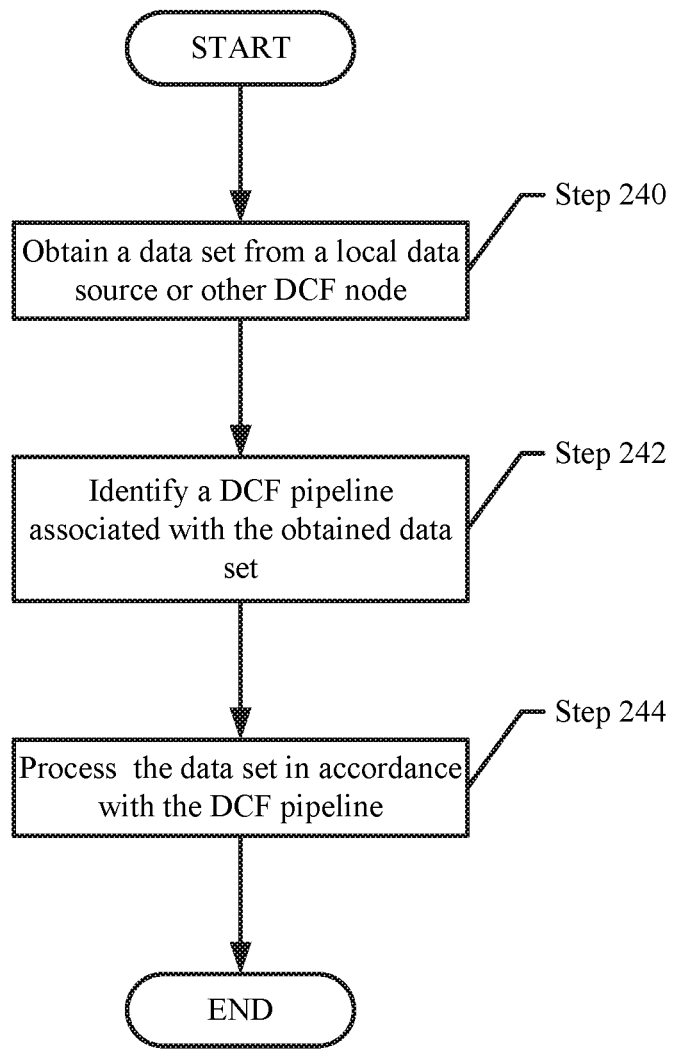
FIG. 2C shows a flowchart for performing data processing in accordance with one or more embodiments of the invention.
Figure 2D:
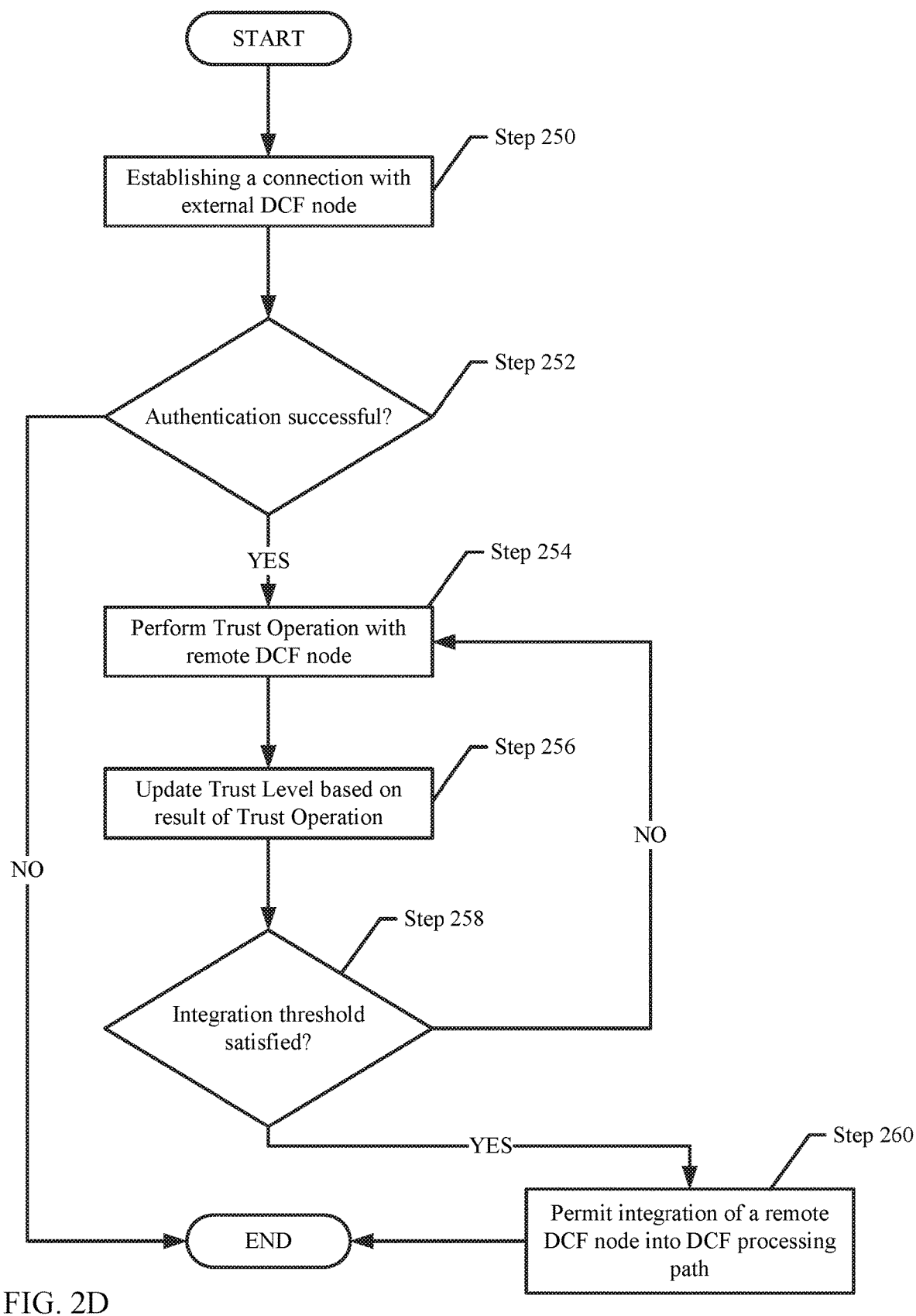
FIG. 2D shows a flowchart for integrating remote DCF nodes into a DCF processing path in accordance with one or more embodiments of the invention.

In one or more embodiments of the invention, the DCF configurator (142) communicates with the clients to present options for configuring one or more DCF nodes (which may include remote DCF nodes that are permitted to be integrated into a DCF processing path, see e.g., FIG. 2D). The options may be presented via a graphical user interface (GUI). The DCF configurator may send the options to a client (on which the clients is executing) to be displayed by the GUI operating in the client.

In one or more embodiments of the invention, the options (also referred to as configuration options) specify configurations to be implemented on node managers of the DCF nodes. The configurations may specify options for augmenting unprocessed data and/or modifying the unprocessed data to generate processed data, options for storing the data (either processed data or unprocessed data) and/or options for isolating the generated data from other clients. The configurations may be associated with a DCF pipeline in which the data is obtained and/or stored. In one or more embodiments of the invention, a DCF pipeline is a process (which may include multiple processing steps) to be performed by a node manager when obtaining and/or storing unprocessed data. In one embodiment of invention, the DCF configuration (142) may also provide the clients with the ability to specify a DCF processing path from a set of DCF nodes, which may include, source DCF nodes, non-source DCF nodes, and remote DCF nodes (which may be either source DCF nodes or non-source DCF nodes in other DCFs). For example, the client may specify the DCF nodes (including remote DCF nodes) and the order in which the DCF nodes are to process the data. Accordingly, the client may be able to specify a DCF processing path. Further, for each DCF node in the processing path, the client may be able to specify the specific processing that is to be performed. The specific processing that is performed on a given DCF node may be referred to as a DCF pipeline. Thus, a DCF processing path may specify the set of DCF pipelines that are to be used to process the data.

The following discussion describes the configuration of a DCF pipeline on a given DCF node, which may then be combined with the DCF pipelines of other DCF nodes to generate the DCF processing path.

Turning the configuration options of the DCF pipeline, in one or more embodiments of the invention, the GUI may specify options for augmenting the unprocessed data. In one or more embodiments of the invention, the unprocessed data is augmented by generating additional data to be embedded in the unprocessed data prior to storage. The additional data may be, for example, metadata, digital signatures, identification information, etc.

In one or more embodiments of the invention, the metadata includes characteristics that may be useful to a computing device obtaining the data to determine a reliability of the data. The characteristics may include, for example, a data set identifier (e.g., a combination of letters, characters, and/or numbers that uniquely identify the processed or unprocessed data), a geographical location associated with the data, a type of data (e.g., temperature measurements, recorded video, speedometer data, etc.), a data source identifier (e.g., a combination of letters, characters, and/or numbers that uniquely identify a local data source from which the unprocessed data was obtained), etc. A client may specify, e.g., using the GUI, which, if any, of the characteristics should be generated and/or embedded into (or otherwise associated with) the unprocessed data.

In one or more embodiments of the invention, the identification information specifies ownership of the data. The owner of the data may be a legal entity that has the right to store, obtain, use, and/or profit from the data. A legal entity may be a person, a group of people, a partnership, corporation, any other business entity, or any combination thereof. The client may specify, e.g., using the GUI, whether the identification information should be generated and/or embedded into (or otherwise associated with) the unprocessed data. The identity of the owner may be specified using the DID for the owner.

In one or more embodiments of the invention, a digital signature of unprocessed data is data that is generated using a private key and the unprocessed data. The digital signature may be generated, for example, by performing a function (e.g., a hash function) on the unprocessed data to generate a value, and performing a secondary function (e.g., encryption) on the value using the private key. The client may specify, e.g., using the GUI, whether a digital signature should be generated and/or embedded into (or otherwise associated with) the unprocessed data. The public-private key pair may be associated with the owner, where the data is signed using the private key of the owner of the data (also referred to as an object(s)).

In one or more embodiments of the invention, the GUI specifies options for modifying the unprocessed data. The data may be modified by, for example, performing an encryption and/or performing compression on the unprocessed or processed data prior to storing the data. In one or more embodiments of the invention, performing compression on unprocessed data includes applying a compression algorithm on the unprocessed data to generate processed data such that the processed data includes less data than the unprocessed data. The client may specify, e.g., using the GUI, whether to modify the data prior to storage and/or the type of modification to perform (e.g., encryption, compression, etc.).

In one or more embodiments of the invention, the GUI specifies options for storing the data. The data may be stored internally in the DCF node (e.g., in a persistent storage of the node manager) and/or externally. For example, the data (processed or unprocessed) may be replicated and stored in a ledger service. In such embodiments, the data (processed or unprocessed) may be stored by generating a ledger entry and storing the data and/or any metadata associated with the data in the ledger entry to be stored in the ledger service. The metadata associated with the data (processed or unprocessed) may further be stored in an object storage. The ledger entry may be used by, e.g., clients for auditing purposes.

In one or more embodiments of the invention, the client specifies, using the GUI, options for storing the processed or unprocessed data and/or any metadata associated with the processed or unprocessed data. The options may include storing the data in a ledger service and/or storing the metadata (if any) in an object storage.

In one or more embodiments of the invention, the GUI specifies options for isolating processed and/or unprocessed data. Specifically, the client may specify that the processed and/or unprocessed data is to be stored in a location in the persistent storage that is not accessible to other clients or in a persistent storage that is physically separate from the persistent storage used to stored process and/or unprocessed data associated with other clients. Further, the client may also specify that the processed and/or unprocessed data is to be transmitted to the persistent storage, the object storage, and/or to any other external storage location via its own communication channel (i.e., a communication channel that is not used to transmit processed and/or unprocessed data associated with any other client). The isolated communicated channel may be implemented using, e.g., a virtual private network, or any other network (or communication) protocol that isolates network traffic. In addition, the unprocessed and/or processed data may be isolated from other clients using, e.g., encryption. Other methods for isolating the processed and/or unprocessed data may be used without departing from the invention.

The invention is not limited to aforementioned options from which the user may select via a GUI. Moreover, while the options may be selected using a GUI, the options may be selected using any other selection mechanism (now or later discovered) without departing from the invention. For example, the options may be provided using a command line interface, an application programming interface(s) (API)(s), or any other mechanism for providing options to the clients and/or for receiving the selections from the clients.

In one or more embodiments of the invention, the DCF configurator (142) generates a DCF configuration file based on the selection of options obtained from the client. The DCF configuration file may include options selected by the user for a given DCF node. In addition, if the DCF node is part of a DCF processing path, then the DCF configuration file may include information about the other DCF nodes in the DCF processing path and information (e.g., IP addresses) about how to access or communicate with such other DCF nodes in the DCF processing path. For additional details regarding the generation of the DCF configuration file, see, e.g., FIG. 2A.

In one or more embodiments of the invention, DCF configurator (142) is a hardware device including circuitry. The DCF configurator (142) may be, for example, a digital signal processor, a field programmable gate array, or an application specific integrated circuit. The DCF configurator (142) may be other types of hardware devices without departing from the invention.

In one or more embodiments of the invention, the DCF configurator (142) is implemented as computing code stored on a persistent storage that when executed by a processor of the data management system (140) performs the functionality of the DCF configurator (142). The processor may be a hardware processor including circuitry such as, for example, a central processing unit or a microcontroller. The processor may be other types of hardware devices for processing digital information without departing from the invention.

In one or more embodiments of the invention, the node manager (144) interfaces with DCF nodes to configure one or more DCF nodes (which may include remote DCF nodes that are permitted to be integrated into a DCF processing path). Specifically, the node manager (144) deploys DCF configuration files generated by the DCF configurator (142). The node manager (144) may identify the node managers to which to send the DCF configuration files and subsequently send the DCF configuration files to the identified node managers.

In one or more embodiments of the invention, node manager (144) is a hardware device including circuitry. The node manager (144) may be, for example, a digital signal processor, a field programmable gate array, or an application specific integrated circuit. The node manager (144) may be other types of hardware devices without departing from the invention.

In one or more embodiments of the invention, the node manager (144) is implemented as computing code stored on a persistent storage that when executed by a processor of the data management system (140) performs the functionality of the node manager (144). The processor may be a hardware processor including circuitry such as, for example, a central processing unit or a microcontroller. The processor may be other types of hardware devices for processing digital information without departing from the invention.

In one embodiment of the invention, the DCF node registry (146) lists all DCF nodes in the DCF (i.e., the DCF that is managed by the management data system) that may be used by other DCFs. Each entry in the DCF node registry may specify: (i) a DCF node identifier; (ii) an IP address (or other information) that may be used to access DCF node; and (iii) the type of processing or other capabilities of the DCF node. The capabilities of the DCF node may be a subset of the capabilities of the DCF node. The entries in the DCF node registry may include additional or different information without departing from the invention.

The data management system (or an administrator or other user of the data management system) may determine which DCF nodes to include on the DCF node registry as well as determine which capabilities of the DCF nodes to specify in the DCF node registry.

The DCF node registry (146) may be implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the DCF node registry (146) described in this application.

The DCF node registry (146) may each be implemented as a logical device without departing from the invention. The logical device utilizes computing resources of any number of physical computing devices to provide the functionality of the DCF node registry (146) described throughout this application.

In one embodiment of the invention, the DCF trust manager (148) includes all remote DCF nodes (i.e., DCF nodes that are not managed by the data management system in which the DCF trust manager is located) that satisfy an integration threshold (see e.g., FIG. 2D). Said another way, the DCF trust manager (148) may specify which remote DCF nodes are permitted to be integrated into a DCF processing path with DCF nodes of the DCF (i.e., the DCF managed by the data management system in which the DCF trust manager is located). Each entry in the DCF trust manager (148) may specify: (i) a remote DCF node identifier; (ii) an IP address (or other information) that may be used to access remote DCF node; and (iii) the type of processing or other capabilities of the remote DCF node. The entries in the DCF trust manager may include additional or different information without departing from the invention.

In one embodiment of the invention, the DCF trust manager (148) includes remote DCF nodes that have been processed using FIG. 2D, where the result of the processing is that the remote DCF node may be integrated into a DCF processing path. By implementing a DCF trust manager, the results of processing a given remote DCF trust node by a component in the DCF (e.g., by a DCF node, by the data management system, etc.) may be used by other components in the DCF. In this manner, fewer resources within a DCF may be used to determine whether to integrate a remote DCF node into a DCF processing path. The DCF trust manager may receive information about which remote DCF nodes may be integrated into the DCF processing path from local trust managers operating on DCF nodes (see e.g., FIGS. 1C and 1D).

The DCF trust manager (148) may be implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the DCF trust manager (148) described in this application.

The DCF trust manager (148) may each be implemented as a logical device without departing from the invention. The logical device utilizes computing resources of any number of physical computing devices to provide the functionality of the DCF trust manager (148) described throughout this application.

Figure 1C:
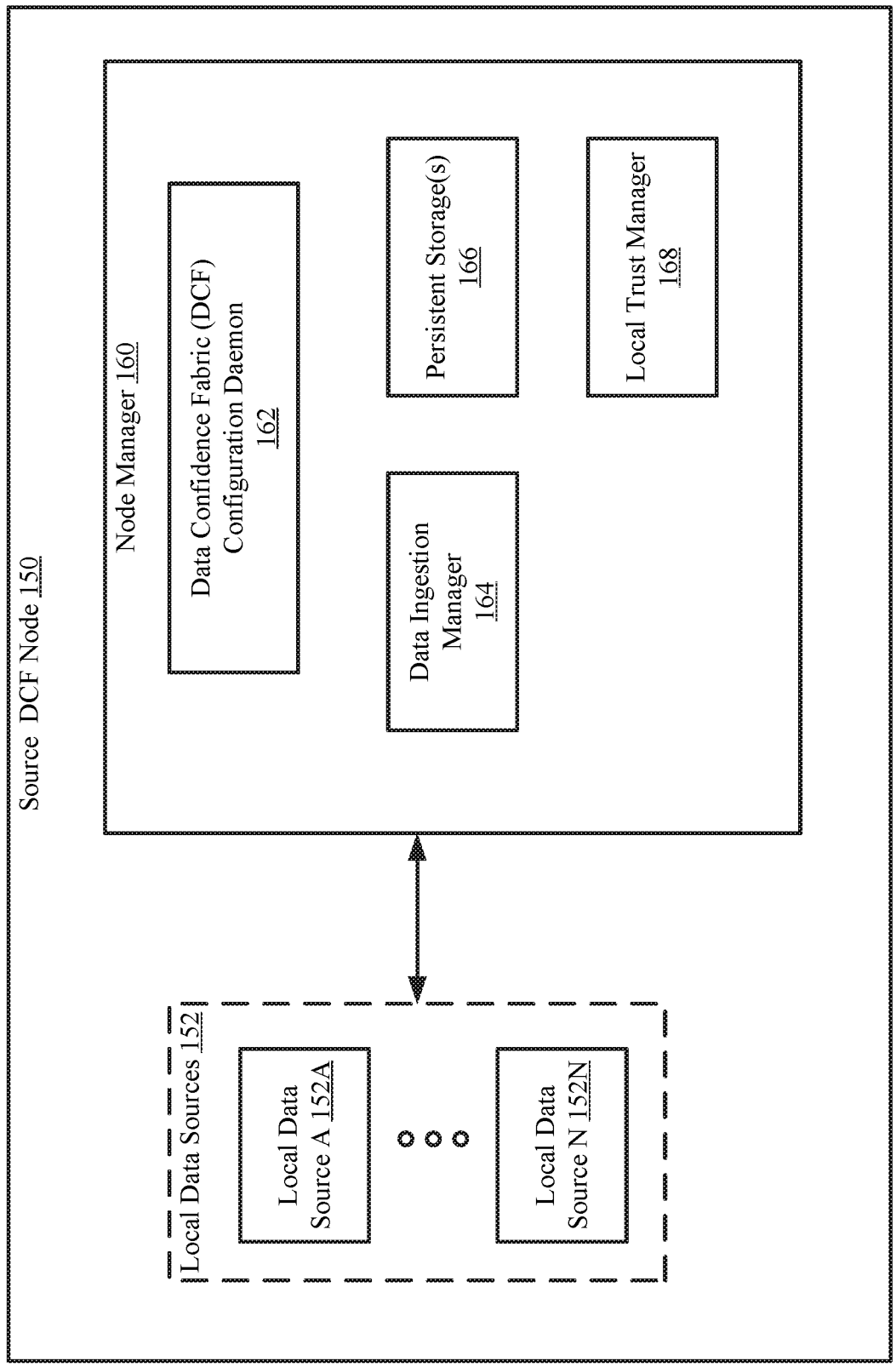
FIG. 1C shows a diagram of a source DCF node in accordance with one or more embodiments of the invention.

FIG. 1C shows a diagram of a source DCF node in accordance with one or more embodiments of the invention. The Source DCF node (150) may include local data sources (152) and a node manager (160). The Source DCF node (150) may include additional, fewer, and/or different components without departing from the invention. Each component of the Source DCF node (150) illustrated in FIG. 1C is discussed below.

In one or more embodiments of the invention, the local data sources (152) are sources of data obtained from real-world processes. A data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (152A, 152N) is an Internet-of-things (IOT) device. For example, one of the data sources (152A) may be a camera operably connected to the Internet and that supplies data via an IOT standard to the node manager (160). The data may be a video stream of a particular location. Image recognition may be utilized to extract relevant information from the video stream. The relevant information may be supplied to the node manager (160) in isolation or in combination with the video stream itself.

In one or more embodiments of the invention, the node manager (160) is a device (e.g., a computing device as shown in FIG. 4) that manages data obtained from the local data sources (152). The node manager (160) may manage the data by storing the data in internal storage (e.g., persistent storage (166)) or external storage and/or providing the data to external entities (e.g., clients). The node manager (160) includes a DCF configuration daemon (162), a data ingestion manager (164), persistent storage (166), and a local trust manager (168). The node manager may include additional, fewer, and/or different components without departing from the invention.

In one or more embodiments of the invention, the DCF configuration daemon (162) manages the configuration of components of the local data manger (160). Specifically, the DCF configuration daemon (162) configures the data ingestion manager (164) based on a DCF configuration file(s) obtained from a data management system. The DCF configuration daemon (162) may configure the data ingestion manager (164) in accordance with the method of FIG. 2B. The DCF configuration daemon may configure the data ingestion manager (164), or other components of the node manager (160), via other methods without departing from the invention.

In one or more embodiments of the invention, the DCF configuration daemon (162) is implemented as computing code stored on a persistent storage (e.g., 166) that when executed by a processor of the node manager (160) performs the functionality of the DCF configuration daemon (162). The processor may be a hardware processor including circuitry such as, for example, a central processing unit or a microcontroller. The processor may be other types of hardware devices for processing digital information without departing from the invention.

In one or more embodiments of the invention, the data ingestion manager (164) manages how unprocessed data is obtained (also referred to as ingested) from the local data sources (152). The data ingestion manager (164) may process the unprocessed data to generate processed data store the processed data in accordance with a DCF pipeline. The DCF pipeline may be specified by a DCF configuration file used by the DCF configuration daemon to configure the data ingestion manager (164). In one embodiment of the invention, the data ingestion manager (164) may have stored thereon or have access to the private key of the owner (as described above). The data ingestion manager (164) may use the private key to sign the data (or portions thereof) and/or encrypt the data.

In one embodiment of the invention, the node manager (160) may receive multiple DCF configuration files. Each of these DCF configuration files may specify a different DCF pipeline.

In one or more embodiment of the invention, and as discussed above, the DCF configuration files may include information about a DCF processing path of which the source DCF node is a part. In such scenarios, the DCF configuration file may include information about the next DCF node in the processing path (i.e., the next DCF node that is going to process the data after the DCF node (150)).

While FIG. 1C shows the DCF node (150) obtaining data from local data sources, the DCF node may also be able to obtain data from other source DCF nodes and non-source DCF nodes (which may or may not be remote DCF nodes).

The persistent storage (166) may be configured to store data as well as trust levels of each of the remote DCF nodes that are being processed in accordance with FIG. 2D and/or that are part of a DCF processing path. The persistent storage (166) may be a physical storage. For example, the persistent storage (166) may include hard disk drives, solid state drives, and/or tape drives for storing data. The persistent storage (166) may include other types of non-transitory storage mediums without departing from the invention.

In one or more embodiments of the invention, the persistent storage (166) stores data obtained from the local data sources (152). The data stored in the persistent storage (166) may be provided to clients with which the data is associated, i.e., the client associated with the DCF pipeline that processed and ultimately caused the data to be stored in the persistent storage.

In one embodiment of the invention, the local trust manager (168) includes functionality to perform all or a portion of the method shown in FIG. 2D in order to determine whether to integrate a given remote DCF node into a DCF processing path. The local trust manager (168) may also include functionality to provide the results of the processing of FIG. 2D to the DCF trust manager (discussed above).

Figure 1D:
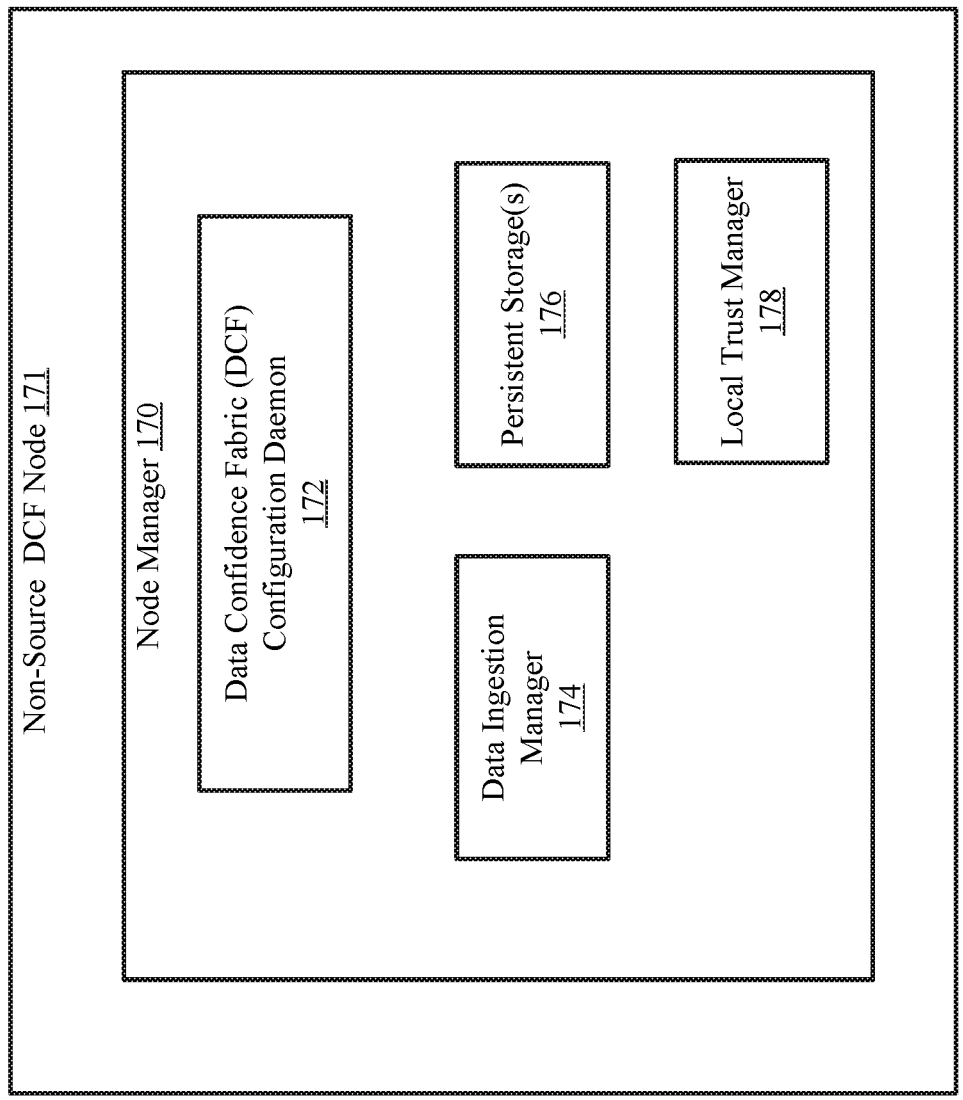
FIG. 1D shows a diagram of a non-source DCF node in accordance with one or more embodiments of the invention.

FIG. 1D shows a diagram of a non-source DCF node in accordance with one or more embodiments of the invention. The non-source DCF node (171) in FIG. 1D operates in manner that is substantially similar to the source DCF node (150, FIG. 1C) except that the non-source DCF node (171) is only able to receive data from source DCF nodes or non-source DCF nodes. Said another way, while source DCF nodes obtain data directly from local data sources, the non-source DCF nodes are only able to obtain data indirectly via source DCF nodes and/or non-source DCF nodes.

In one embodiment of the invention, the node manager (170) operates in a substantially similar manner to node manager (160, FIG. 1C). Further, DCF configuration daemon (172) operates in a substantially similar manner to DCF configuration daemon (162, FIG. 1C), data ingestion manager (174) operates in a substantially similar manner to data ingestion manager (164, FIG. 1C), persistent storage (176) operates in a substantially similar manner to persistent storage (166, FIG. 1C), and the local trust manger (178) operates in a substantially similar manner to local trust manager (168, FIG. 1C).

FIGS. 2A-2D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2D may be performed in parallel with any other steps shown in FIGS. 2A-2D.

FIG. 2A shows a flowchart for managing data confidence fabric configuration in accordance with one or more embodiments of the invention. The method shown in FIG. 2A may be performed by, for example, a data management system (100, FIG. 1A). Other components of the system illustrated in FIG. 1A may perform the method of FIG. 2A without departing from the invention.

Turning to FIG. 2A, in step 200, a DCF configuration request is obtained. In one or more embodiments of the invention, the DCF configuration request is obtained by a DCF configurator of the data management system. The DCF configuration request may specify a request to configure one or more DCF nodes. In one or more embodiments of the invention, the DCF configuration request is obtained from a client. The DCF configuration request may specify the type of data to be processed (e.g., traffic data, temperature data, audio, etc.). Alternatively, the DCF configuration request may specify one or more DCF nodes.

In step 202, configuration options are provided to the client using a graphical user interface. In one or more embodiments of the invention, the DCF configuration options specify the options for configuring the DCF nodes (which may include remote DCF nodes specified in the DCF Trust Manager). The options may be for augmenting the data, modifying the data, and/or storing the data on a per-DCF node basis. The options may also enable the client to specify a DCF processing path using any combination of DCF nodes (including the available remote DCF nodes in the DCF trust manager) and the order in which the DCF nodes are to process the data. The DCF configuration options may be sent by the DCF configurator.

In one or more embodiments of the invention, the client (or a user using the client) makes a selection of the options using the GUI. The selection of the options may include all or a portion of the options provided by the data management system. The options may be displayed using categories based on the types of options for configuration. For example, a first category may be "Device Data" that displays options for configuring the type of data to be processed during data ingestion. A second category may be, for example, "Provenance Data" that displays options for configuring the generation of metadata associated with ingested data. This may also include signing the objects using a private key of the owner. A third category may be, for example, "Identity" that displays options for configuring the identification information of the obtained data. Additional categories may be displayed for additional options without departing from the invention.

In one embodiment of the invention, the GUI is provided to the client in response to the DCF configuration. In other words, the GUI is sent to the client to be used when selecting from the configuration options.

In one embodiment of the invention, access to the GUI is provided to the client. For example, a link (e.g., a hyperlink) to the GUI is sent to the client, and the GUI may be accessed by the client from the data management system.

Alternatively, the configuration options may be provided to the client using a non-graphical user interface such as, for example, a command line interface (CLI), application programming interfaces (APIs), or a hypertext transfer protocol (HTTP) interface. The client may communicate the selection using the corresponding non-graphical user interface.

In step 204, acceptance of the DCF configurations is obtained. In one or more embodiments of the invention, the acceptance includes the selection of the configuration options (which may also include information about the DCF processing path).

In step 206, a DCF configuration file(s) is generated based on the DCF configurations. In one or more embodiments of the invention, the DCF configuration file is generated by obtaining a data structure that specifies the selection of options in a format that is readable by a DCF configuration daemon. The DCF configuration file may specify a DCF pipeline that specifies a process for modifying, augmenting, isolating, and/or storing data based on the selection of configuration options. The DCF configuration file may also specify the client that specified the DCF configurations. The DCF configuration file may be generated by the DCF configurator. The processing in step 206 may generate one DCF configuration file for a particular DCF node. However, if the configuration options specify a DCF processing path along with configuration operations for processing on each of the DCF nodes, then the processing step 206 includes generating multiple DCF configuration files—one per DCF node specified in the DCF processing path. Further, in addition to specifying the DCF pipeline for the DCF node (i.e., the DCF node that is to be configured using the DCF configuration file), the DCF configuration file may also specify: (i) the next DCF node in the DCF processing path; (ii) what data (which may be processed data) to send to the next DCF node in the DCF processing path; and (iii) information about how to send data (or otherwise communicate with) the next DCF node in the DCF processing path.

The DCF configuration file may include additional and/or different information without departing from the invention.

In step 208, the DCF configuration file(s) is deployed to one or more node managers (which may be node manager on remote DCF nodes) based on the DCF configuration request. In one or more embodiments of the invention, the DCF configuration file is deployed using a push deployment mechanism that includes sending the configuration file as a virtual container to one or more node managers. The node managers may be specified in the DCF configuration file. Alternatively, the DCF configuration file may specify a type of data, and the DCF configurator may identify one or more node managers that obtain the type of data. The DCF configuration file may then be sent to the identified node managers.

In one or more embodiments of the invention, the DCF configuration file is deployed using a decentralized deployment mechanism. The decentralized deployment mechanism may include generating a configuration file identifier associated with the DCF configuration file and providing the configuration file identifier, along with a minimum set of information that may be used by the node managers to determine whether (or not) to request the DCF configuration file from all (or a portion) of the data management systems. Each node manager may determine whether to obtain the DCF configuration file from the data management system in response to receiving the configuration file identifier (and the aforementioned accompanying information). If a node manager determines that it should obtain the DCF, the node manager may send a request that specifies the confirmation file identifier to the data management system. The data management system subsequently sends the DCF configuration file to the node manager.

FIG. 2B shows a flowchart for configuring a node manager in accordance with one or more embodiments of the invention. The method shown in FIG. 2B may be performed by, for example, a node manager (160, FIG. 1C; 171, FIG. 1D). Other components of the system illustrated in FIG. 1A, FIG. 1C, or FIG. 1D may perform the method of FIG. 2B without departing from the invention.

In step 220, a DCF configuration file is obtained. In one or more embodiments of the invention, the DCF configuration file is obtained based on the deployment mechanism of the data management system (as described above).

In step 222, configuration properties associated with the DCF configuration file are identified. The configuration properties may be identified using a DCF configuration daemon of the node manager. In one or more embodiments of the invention, the configuration properties include each configuration options specified in the DCF configuration file. The DCF configuration daemon may analyze the DCF configuration file and identify each configuration property.

In one or more embodiments of the invention, each configuration property specifies a configuration for augmenting, modifying, isolating, and/or storing data obtained from one or more local data sources. The configuration property may specify the local data source and/or the type of data for which the node manager is to process the data.

In step 224, a DCF configuration is performed based on the identified configuration properties. In one or more embodiments of the invention, the configuration is performed by selecting an identified configuration property and configuring a data ingestion manager to perform a process in accordance with the configuration property. For example, a configuration property may specify a digital signature to be generated for incoming traffic data. The DCF configuration daemon may configure the data ingestion manager to determine whether incoming data is traffic data and, if the incoming data is traffic data, to generate a signature of the incoming data. The process may be repeated for all identified configuration properties.

In one or more embodiments of the invention, the configuration is performed by generating a DCF pipeline based on the configuration properties. The DCF pipeline may be a process for processing incoming data in accordance with the configuration properties. The DCF pipeline may be associated with a type of data and/or a local data source. The DCF configuration daemon may subsequently configure the data ingestion manager to perform the DCF pipeline for associated data sets and/or associated local data sources.

FIG. 2C shows a flowchart for performing data processing in accordance with one or more embodiments of the invention. The method shown in FIG. 2C may be performed by, for example, a node manager (160, FIG. 1C or 171, FIG. 1D). Other components of the system illustrated in FIG. 1A, FIG. 1C, or FIG. 1D may perform the method of FIG. 2C without departing from the invention.

In step 240, a data set (or data) is obtained from a local data source (if the node is a source DCF node) or from another DCF node (which may be a source DCF node or a non-source DCF node). The data set may be obtained by a data ingestion manager of the node manager. In other scenarios, step 240 may include receiving a reference to the data (which may or may not be processed) instead of the data itself. The reference may be to an object in an object store or a reference to an entry in a ledger service. Other references may be used without departing from the invention.

In step 242, a DCF pipeline that is identified is associated with the obtained data set. In one or more embodiments of the invention, the data ingestion manager may identify a type of data of the data set, the source of the data set (e.g., the local data source), and/or any other characteristics of the data set, and, using the aforementioned characteristics, identify a DCF pipeline that is associated with the data set from the set of DCF pipelines in the DCF pipeline registry. For example, if the obtained data set is an audio recording, the data ingestion manager may identify a DCF pipeline associated with audio data. In another example, the data set may be for a specific local data source (e.g., data obtained from a specific IoT device). In this scenario, the DCF pipeline for the specific IoT device is selected.

In step 244, the data (or data set) is processed and/or stored in accordance with the DCF pipeline(s). In one or more embodiments of the invention, the DCF pipeline performs the DCF pipeline to store the obtained data set. The data ingestion manager may perform the process of the DCF pipeline in the specified order. In one or more embodiments of the invention, the process includes augmenting the data, modifying the data, isolating, and/or storing the data. The data ingestion manager may augment the data, modify the data, performs actions to isolate the data (creating a separate communication channel over which to transmit the data, encrypting the data, etc.) and/or store the data in accordance with the DCF pipeline.

In one embodiment of the invention, if the DCF node is part of a processing path that is associated with the data, then the DCF node may, as part of the processing: (i) send the data or processed data to a next DCF node in the DCF processing path; (ii) send a reference to the data (or processed data) to the next DCF node in the DCF processing path; and/or (iii) notify a next DCF node in the DCF processing path that the DCF node has finished processing the data.

The method shown in FIG. 2C may be performed each time a data set is received. Moreover, if multiple DCF pipelines are associated with the data set (as specified in the DCF pipeline registry), the method shown in FIG. 2C may be performed multiple times on the same data set with different DCF pipelines.

In one embodiment of the invention, if a DCF processing path is used to process data, then the data management system may include functionality to processing a DCF processing path trace request for a given DCF processing path. The DCF processing path trace request may be sent by a client (or an application executing on a client). In response to the DCF processing path trace request, the data management system may provide the client (or application) with the following information: the DCF nodes in the DCF processing path, the IP address of each DCF node, the order in which the DCF nodes process the data, and information amount the processing that each DCF node performs. The data management system may provide additional or different information without departing from the invention.

FIG. 2D shows a flowchart for integrating remote DCF nodes into a DCF processing path in accordance with one or more embodiments of the invention. The method shown in FIG. 2D may be performed by, for example, a node manager (160, FIG. 1C; 170, FIG. 1D). Other components of the system illustrated in FIG. 1A-1D may perform the method of FIG. 2C without departing from the invention.

In step 250, a connection between the DCF node and a remote DCF node is established. The connection may be initiated by either the DCF node or the remote DCF node sending a connection request. The entity that initiates the connection (e.g., sends the connection request) may be able to directly or indirectly obtain information, such as an IP address, of the other DCF node. For example, if a remote DCF node attempts to connect to a DCF node, the remote DCF node may obtain an IP address of the DCF node from a public location and/or from a broadcast message that is sent by the DCF node that advertises its ability to connect to remote DCF nodes. In another scenario, the remote DCF node may send a request to the data management system of the DCF to request a listing of DCF nodes to which it may connect. The data management system may then provide the remote DCF node with a listing of available DCF nodes using the entries listed in the DCF node registry. The remote DCF node may then use this information to send a connection request to the DCF node. The DCF node may operate in the same or substantially the same manner to obtain information about remote DCF nodes and then subsequently use this information to establish a connection with the remote DCF node. The connection between the DCF node and the remote DCF node may be made using any other mechanism without departing from the invention.

In step 252, after the connection has been established, the DCF node and the remote DCF node may perform mutual authentication and/or use any other mechanism(s) to verify each other's identity, e.g., digital signatures. In one embodiment of the invention, the remote DCF node and the DCF node may each have verifiable credentials that establish their identity and they may use these verifiable credentials to authenticate each other.

The verifiable credentials may be implemented in accordance with "Verifiable Credentials Data Model 1.0 Expressing verifiable information on the Web-W3C Proposed Recommendation 5 Sep. 2019" published by the World Wide Web Consortium (W3C), which is hereby incorporated by reference in its entirety. The verifiable credentials may be implemented using other specifications without departing from the invention.

If the mutual authentication fails (or if a DCF node is unable to verify the identity of the other DCF node), the process ends; otherwise, the process proceeds to step 254.

In step 254, the DCF node performs a trust operation with the remote DCF node. The trust operation may be any operation(s) that the DCF node requests that the remote DCF node performs, where the result of performing the operation(s) by the remote DCF node can be verified and/or validated by the DCF node. In one embodiment of the invention, the trust operations are performed in order to verify that the remote DCF node is processing the data in the manner that is expected by the DCF node.

The following describes various non-limiting example of trust operations.

Trust Operation—Example 1

If the remote DCF node going to be used to encrypt the data, then the DCF node may provide test data (also referred to as a challenge) and ask the remote DCF node to encrypt the data with its private key and then provide the encrypted data back to the DCF node. The DCF node may then decrypt the encrypted data with the remote DCF nodes public key to verify that remote DCF node is properly encrypting data.

Trust Operation—Example 2

If the remote DCF node going to be used to store data in an object store with an object identifier (OID), then the DCF node may provide the remote node with an object (i.e., data to store) and ask the remote DCF node to store the object along with an OID in an object store and then provide the DCF node with the OID and a reference to the object in the object store. The DCF node may then hash its copy of the data to obtain an OID and compare it to the received OID. Further, the DCF may obtain the data stored in the object store along with the stored object and verify that the stored OID matches the generated OID and also hash the stored object (which was retrieved from object store) and confirm that stored object matches the object that was initially provided to the remote DCF node.

Trust Operation—Example 3

If the remote DCF node going to be used to sign the data, then the DCF node may provide test data (also referred to as a challenge) and ask the remote DCF node to sign the data with its private key and then provide the signed data back to the DCF node. The DCF node may then verify the digital signature generated by the remote DCF node.

In step 256, the result of the trust operation is used to update the trust level associated with the remote DCF node. If the trust operation is successfully performed (i.e., the remote DCF node is operating in the manner expected by the DCF node), then the trust level associated with the remote DCF node is increased; otherwise, the trust level of the DCF node is decreased.

In step 258, a determination is made about whether the trust level associated with the remote DCF node has reached an integration threshold. The integration threshold corresponds to a minimum trust level that is required for a remote DCF node to be including within a DCF processing path. If the trust level associated with the remote DCF node has reached an integration threshold the process proceeds to step 360; otherwise, the proceeds to step 254.

For security purposes, the remote DCF node may initially have a low trust level. The trust level may then be increased by performing trust operations. Once a sufficient number of trust operations have been performed the trust level will meet or exceed to the integration threshold.

In one embodiment of the invention, the DCF node may ultimately determine, e.g., after performing one or more trust operations with the remote DCF node, that the remote DCF node is not operating properly (as evidenced by its failure (or repeated) failure to provide correct results when performing trust operations). In such scenarios, the DCF node may stop performing any future trust operations with the remote DCF node.

In step 260, the remote DCF node is permitted to be integrated into a DCF processing path. In one embodiment of the invention, an entry for the remote DCF node is created by the DCF trust manager. The clients may then use the remote DCF node in a DCF processing path. Additionally, or alternatively, the DCF node may request that the DCF configurator modify an existing DCF processing path to incorporate the remote DCF node. In this scenario, one or more DCF configuration files are created by the DCF configurator and provided to the appropriate DCF nodes and remote DCF nodes in the DCF processing path. Once the aforementioned DCF configuration files are processed by the DCF nodes and/or remove DCF nodes, the remote DCF node is used to process data that is part of a DCF processing path.

The method shown in FIG. 2D may be performed by a DCF node with multiple remote DCF nodes. Further, each DCF node in the DCF may perform the method shown in FIG. 2D.

Once a given remote node has a trust level that meets or exceeds the integration threshold, the DCF (via a DCF node and/or the data management system) continues to monitor the operation of the remote note. The monitoring may include periodically performing additional trust operations with the remote DCF node and/or monitoring how the DCF node is processing data as part of the DCF processing path. The monitoring is used to update the trust level of the remote DCF nodes. If, based on the monitoring, the trust level of a remote DCF node falls below an integration threshold, then the remote DCF node is removed from any DCF processing paths. In this scenario, the remote DCF node may continue to perform trust operations and, if its trust level improves, it may once again be able to be used in a DCF processing path.

Example

The following section describes an example. The example, illustrated in FIGS. 3A-3D, is not intended to limit the invention. Turning to the example and referring to FIG. 3A, consider a scenario in which there an DCF processing path in DCF A (308) that includes the following DCF nodes: DCF node A (300), DCF B (302), DCF Node C (304), and DCF Node D (306). Each of the aforementioned DCF nodes is configured in accordance with FIGS. 2A-2C. Accordingly, data processed by DCF node A (300) is provided to DCF node B (302)[1]; the data is then processed by DCF node B (302) and provided to DCF node C (304)[2]; and finally, the data is then processed by DCF node C (304) and provided to DCF node D (306)[3].

Figure 3B:
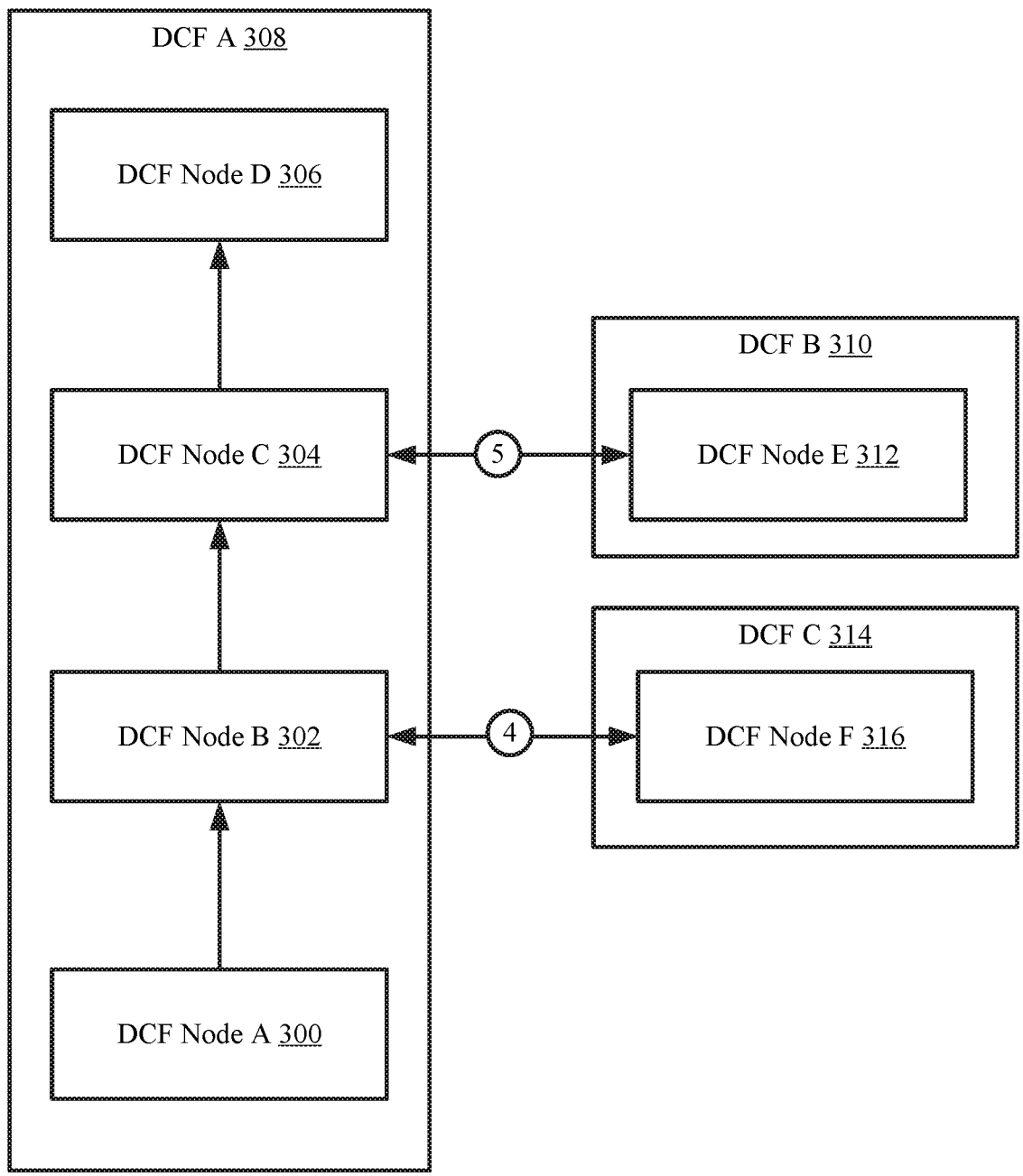

Referring to FIG. 3B, at a later point in time, DCF node C (304) establishes a connection with remote DCF node E (312) in DCF B (310) [5] and DCF node B (302) establishes a connection with remote DCF node F (316) in DCF C (314) [4]. DCF node C (304) initiates the method shown in FIG. 2D to perform trust operations with remote DCF node E (312) and DCF node B (302 initiates the method shown in FIG. 2D to perform trust operations with remote DCF node F (316).

Figure 3C:
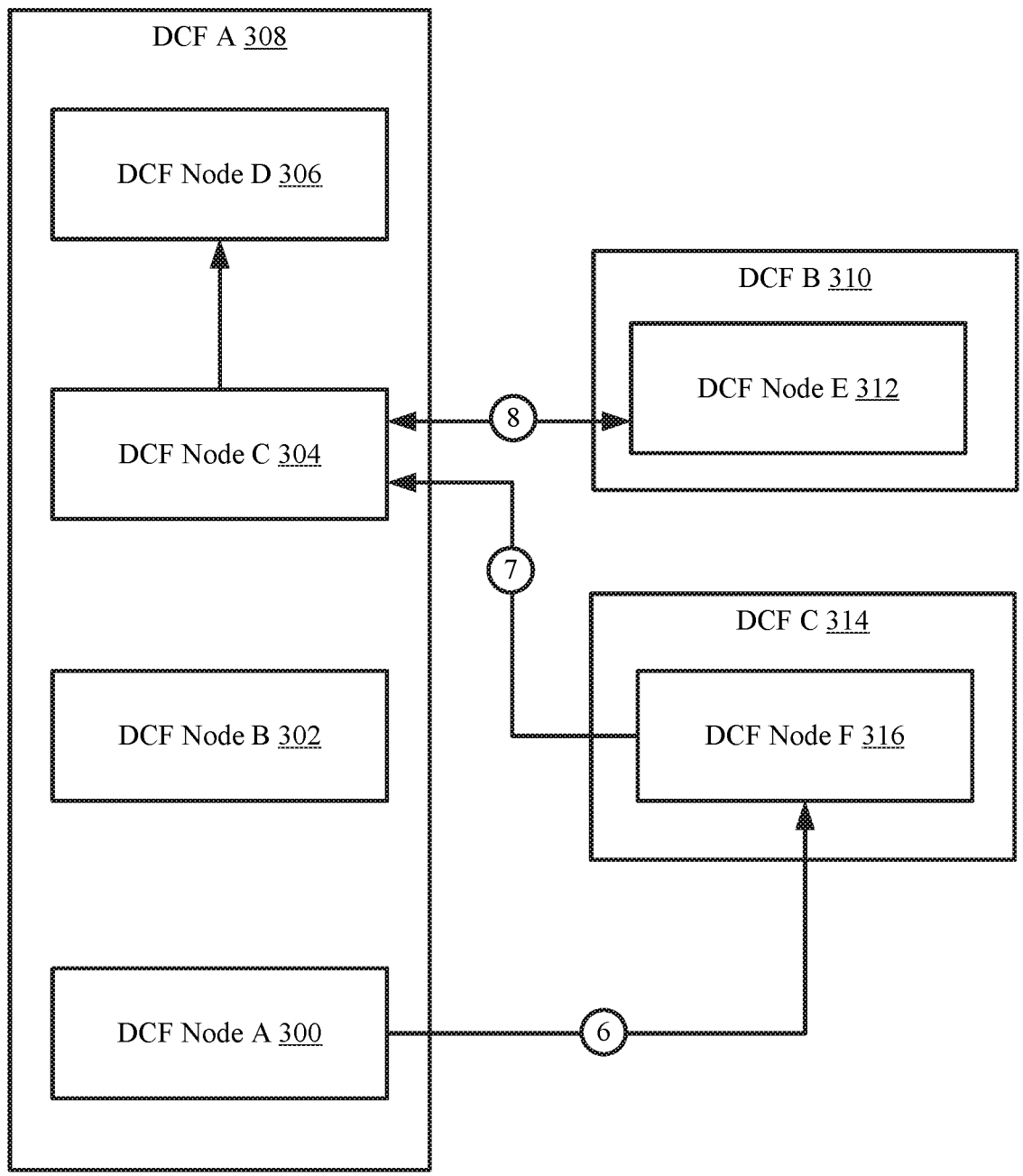

Referring to FIG. 3C, at a later point, remote DCF node F (316) has a trust level that exceeds the integration threshold. This results in the DCF processing path being updated. Specifically, DCF node A (300) is updated to send its processed data to DCF node F (316) [6] and DCF node F (316) is updated to send its processed data to DCF node C (304) [7]. However, at this point in time, the trust level for DCF node E (312) is still below the integration threshold and, as such, it continues to perform trust operations [8]. The data originating from DCF Node A (300) is then processed using the updated DCF processing pipeline.

Figure 3D:
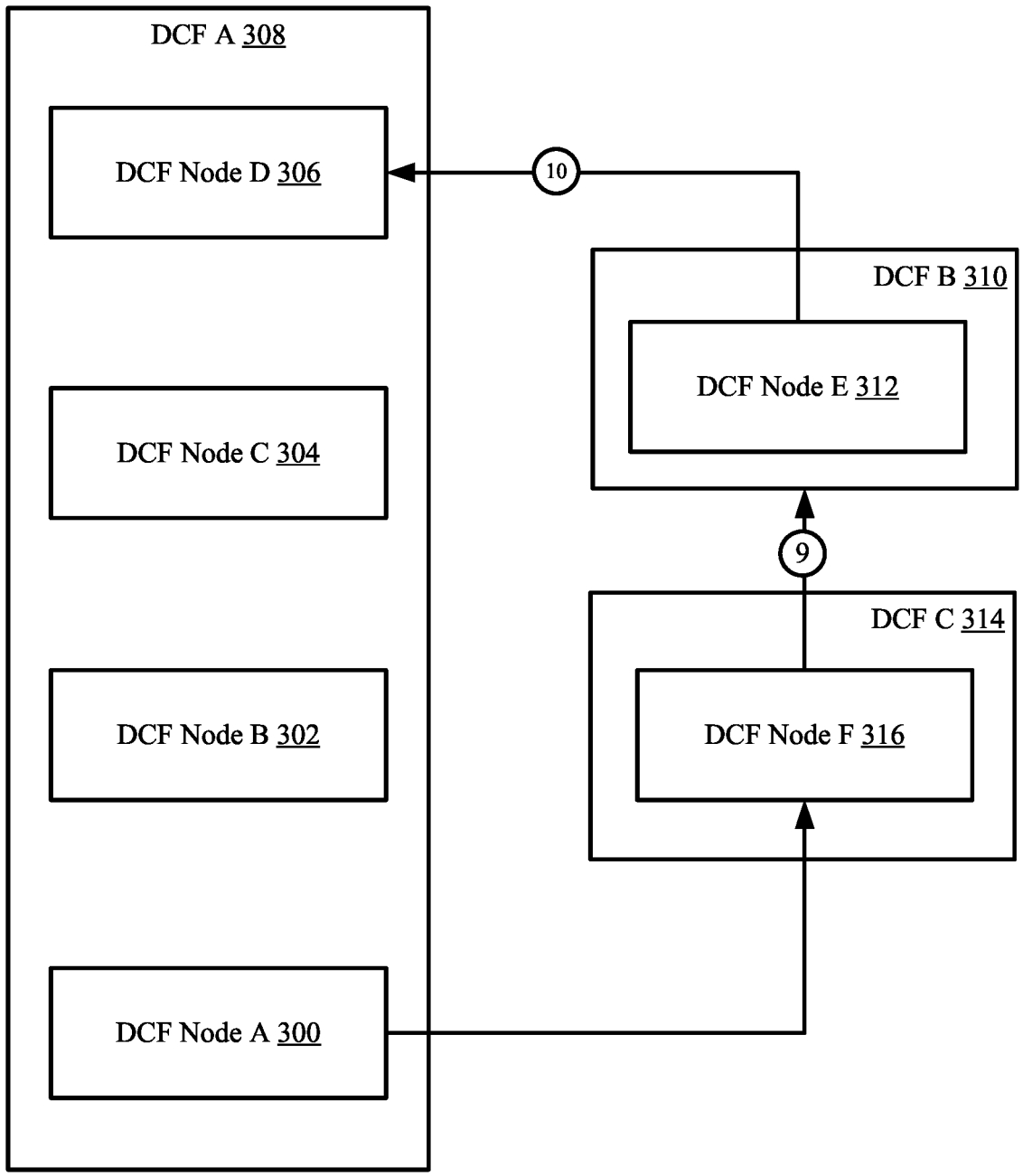

Referring to FIG. 3D, at a later point, remote DCF node E (312) has a trust level that exceeds the integration threshold. This results in the DCF processing path being updated. Specifically, DCF Node F (316) is updated to send its processed data to DCF node E (312) [9] and DCF node E (312) is updated to send its processed data to DCF node D (306) [10]. The data originating from DCF Node A (300) is then processed using the updated DCF processing pipeline.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406).

Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of providing data to a client from, e.g., IoT by managing a data confidence fabric between the client and the internet of things devices. The data confidence fabric is managed by configuring devices that obtain the data to perform specified processes, at the time of ingest, to the data that increase the reliability in using the data. The processed may increase the reliability of the data by augmenting the data to include additional information that may further specify where the data comes from and/or how the data was obtained. In this manner, the client may rely on the additional information to determine a confidence in using the data for application purposes.

Further, embodiments of the invention allow options for modifying the obtained data such that security measures are implemented on the obtained data, further increasing the reliability of the data. In this manner, the client may rely on the modifications to determine that the data has not been undesirably tampered with (or otherwise modified), thus further increasing the reliability of the data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
performing, by a data confidence fabric (DCF) node, a trust operation with a remote DCF node;
updating, based on the trust operation, a trust level associated with the remote DCF node to obtain an updated trust level;
integrating, based on the updated trust level, the remote DCF node into a DCF processing path to obtain a second DCF processing path, wherein the DCF processing path comprises the DCF node; and
processing data using the second DCF processing path.

2. The method of claim 1, further comprising:
prior to performing the trust operation, receiving a connection request from the remote DCF node.

3. The method of claim 1, further comprising:
prior to performing the trust operation, sending, by the DCF node, a connection request to the remote DCF node.

4. The method of claim 1, wherein the performing the trust operation comprises:
sending a challenge to the remote DCF node;
receiving a response to the challenge from the remote DCF node; and
verifying the response by the DCF node.

5. The method of claim 1, wherein the performing the trust operation comprises:
sending test data to the remote DCF node, wherein the test data is processing by a DCF pipeline on the remote DCF node to generate a result;
receiving a reference to the result from the remote DCF node;
obtaining the result using the reference; and
verifying the result by the DCF node.

6. The method of claim 5, wherein the reference corresponds to an entry in a ledger service.

7. The method of claim 5,
wherein the reference corresponds to an object identifier,
wherein the object identifier is generated using the result, and
wherein the object identifier and the result are stored in an object storage.

8. The method of claim 1, further comprising:
after integrating the remote DCF node into the DCF processing path:
monitoring, by the DCF node, the remote DCF node;
updating, based on the monitoring, the updated trust level of the remote DCF node to obtain a second updated trust level.

9. The method of claim 8, further comprising:
removing the remote DCF node from the second DCF processing path when the second updated trust level is below an integration threshold.

10. The method of claim 1, wherein the DCF node is a source DCF node or a non-source DCF node.

11. A non-transitory computer readable medium comprising computer readable program code, which when executed by a computer processor enables the computer processor to perform a method, the method comprising:
performing, by a data confidence fabric (DCF) node, a trust operation with a remote DCF node;
updating, based on the trust operation, a trust level associated with the remote DCF node to obtain an updated trust level;
integrating, based on the updated trust level, the remote DCF node into a DCF processing path to obtain a second DCF processing path, wherein the DCF processing path comprises the DCF node; and
processing data using the second DCF processing path.

12. The non-transitory computer readable medium of claim 11, the method further comprising:
prior to performing the trust operation, receiving a connection request from the remote DCF node.

13. The non-transitory computer readable medium of claim 11, the method further comprising:
prior to performing the trust operation, sending, by the DCF node, a connection request to the remote DCF node.

14. The non-transitory computer readable medium of claim 11, wherein the performing the trust operation comprises:
sending a challenge to the remote DCF node;
receiving a response to the challenge from the remote DCF node; and
verifying the response by the DCF node.

15. The non-transitory computer readable medium of claim 11, wherein the performing the trust operation comprises:
sending test data to the remote DCF node, wherein the test data is processing by a DCF pipeline on the remote DCF node to generate a result;

receiving a reference to the result from the remote DCF node;

obtaining the result using the reference; and verifying the result by the DCF node.

16. The non-transitory computer readable medium of claim 15, wherein the reference corresponds to an entry in a ledger service.

17. The non-transitory computer readable medium of claim 15, wherein the reference corresponds to an object identifier, wherein the object identifier is generated using the result, and wherein the object identifier and the result are stored in an object storage.

18. The non-transitory computer readable medium of claim 11, the method further comprising:

after integrating the remote DCF node into the DCF processing pathway:

monitoring, by the DCF node, the remote DCF node;

updating, based on the monitoring, the updated trust level of the remote DCF node to obtain a second updated trust level.

19. The non-transitory computer readable medium of claim 18, the method further comprising:

removing the remote DCF node from the second DCF processing path when the second updated trust level is below an integration threshold.

20. The non-transitory computer readable medium of claim 11, wherein the DCF node is a source DCF node or a non-source DCF node.

* * * * *